United States Patent [19]
Smith

[11] Patent Number: 5,963,952
[45] Date of Patent: Oct. 5, 1999

[54] INTERNET BROWSER BASED DATA ENTRY ARCHITECTURE

[75] Inventor: Derek Kent William Smith, Richmond Hill, Canada

[73] Assignee: International Business Machines Corp., Armonk, N.Y.

[21] Appl. No.: 08/893,167

[22] Filed: Jul. 15, 1997

[30] Foreign Application Priority Data

Feb. 21, 1997 [CA] Canada ................................... 2198189

[51] Int. Cl.[6] .................................................... G06F 17/00
[52] U.S. Cl. .............................. 707/102; 707/2; 707/501; 707/203
[58] Field of Search ....................... 707/1–206, 501–540; 395/200.3–200.61; 345/227–349; 709/1–400

[56] References Cited

U.S. PATENT DOCUMENTS

| | | | |
|---|---|---|---|
| 5,805,442 | 9/1998 | Crater et al. | 395/200.49 |
| 5,809,242 | 9/1998 | Shaw et al. | 395/200.47 |
| 5,809,512 | 9/1998 | Kato | 707/502 |

*Primary Examiner*—Wayne Amsbury
*Assistant Examiner*—David Yiuk Jung
*Attorney, Agent, or Firm*—A. Bruce Clay

[57] ABSTRACT

The technical field of the present invention is directed to Internet based data entry systems. Problems with existing WEB Browser technologies include an inability to support local storage of entered data due to security issues. A file save option simply saves the source contents of the currently displayed WEB page without any entered data. The present invention provides a method and apparatus for capture of data entered into a WEB page displayed in a WEB Browser including local storage of the entered data on a hard disk of the client computer. The present invention receives entered data in a primary document and generates a secondary document having the entered data as initial conditions within the secondary document for local storage to a hard disk. The primary use of the present invention provides data capture with storage to a local file through a WEB Browser for retaining a personal record of a business transaction and for later transmission through the Internet in a connect mode to a WEB server computer.

24 Claims, 20 Drawing Sheets

150

```
<HTML>
<HEAD>
<TITLE> Internet Browser Based Data Entry System </TITLE>

<SCRIPT LANGUAGE="Java Script">
   //JavaScript Mortgage Application Form Demo, Create a window for data
   entry without the toolbar.
      function CreateThe Form(form) {
         enterWindow=window.open("disclose.htm","", "toolbar=no, menubar=no")
      }
</SCRIPT>

</HEAD>

<BODY BGCOLOR=FFFFFF BACKGROUND="backgrnd.jpg" TEXT=000000>
<H2><I>Internet Based Data Entry System </I></H2>
Please select a desired FORM for local data entry.
<FORM>
<H3>Mortgage:
<INPUT TYPE="button" NAME="Create" VALUE="Request Mortgage
Application Form"
onClick="CreateTheForm()">
</FORM>
</BODY>
</HTML>
```

152 — (script block)
154 — (form block)

┌─────────────────────────────────────────────────────────────┐
      │ <HTML>                                                       │
      │ <HEAD>                                                       │
      │ <TITLE> Internet Browser Based Data Entry System </TITLE>  41│
      │ ┌─────────────────────────────────────────────────────────┐ │
  200 │ │ <SCRIPT LANGUAGE="Java Script">                          │ │
      │ │    //JavaScript Mortgage Application Form Demo           │ │
      │ │    var input0_choice="Mr."                               │ │
      │ │                                                          │ │
  204 │ │ function Download(form) {                                │ │
      │ │                                                          │ │
      │ │    foundError = false;                                   │ │
      │ │                                                          │ │
  206 │ │    //Example First Check for Blank Fields                │ │
      │ │    //Check First Name Field is not blank                 │ │
      │ │    if (foundError = false && isFieldBlank(form.firstName)) { │
      │ │       alert ("You left the First Name Field blank.");    │ │
      │ │         foundError = true;                               │ │
      │ │    }                                                     │ │
  208 │ │    //Example Check for Valid Field                       │ │
      │ │    //Check the Home Phone Number has an area code        │ │
      │ │    if (foundError = false && isValidPhone Number (form.homePhone) = false) { │
      │ │       alert ("You did not enter a valid Home Phone Number with Area Code."); │
      │ │       foundError = true;                                 │ │
      │ │    }                                                     │ │
      │ │    if(foundError=false){                                 │ │
      │ │                                                          │ │
  207 │ │    window.close ("","enterWindow")                       │ │
  209 │ │    capture=window.open();                                │ │
  210 │ │        capture.document.open();                          │ │
      │ │    capture.document.write ("<HTML><HEAD><TITLE>Form Verification │
      │ │ Demo</TITLE></HEAD>\n");                                 │ │
      │ │        capture.document.write ("<BODY>\n");              │ │
      │ │        capture.document.write("<H2>Save this form with a unique │
      │ │        filename.</H2>\n");                               │ │
      │ │        capture.document.write("<TABLE BORDER = 0>\n");   │ │
      │ └─────────────────────────────────────────────────────────┘ │
      └─────────────────────────────────────────────────────────────┘

```
    capture.document.write("<TR><TD>\n");
    capture.document.write("</TD>\n");
    capture.document.write("<TD><H2><I>Mortgage Application
Form.</I></H2>\n");
    capture.document.write("</TD></TR>\n");
    capture.document.write("</TABLE>\n");
    capture.document.write("<FORM
ACTION=\"http://www.ibm.com/cgi-bin/mortgage.pl\"
NAME=mortgageInputDemo METHOD=post>\n");
    capture.document.write("<TABLE BORDER = 0 >\n");
    capture.document.write("<TR><TD BGCOLOR=#FFFF00><B><I>
Applicant Background</I></B></TD></TR><TR><TD>\n");
220    capture.document.write("<SELECT><OPTION SELECTED VALUE=" +
input0_choice + ">"+ input0_choice +"<OPTION VALUE=\"Mr\">Mr <OPTION
VALUE=\"Ms\">Ms <OPTION VALUE=\"Mrs\">Mrs <OPTION VALUE=
\"Miss\">Miss
<OPTION VALUE= \"Dr\">Dr</SELECT>\n");
    capture.document.write("</TD></TR><TR><TD>");
222    capture.document.write("First Name: <INPUT TYPE=\"text\"NAME=
    \"firstName\"
VALUE=\"" + form.firstName.value +"\" MAXLENGTH=20 SIZE=20>\n");
224    capture.document.write("Middle Initial: <INPUT TYPE=\"text\"
NAME=\"middleInitial\" VALUE=\""   + form.middleInitial.value + "\"
MAXLENGTH=1 SIZE=1>\n");
226    capture.document.write("Last Name: <INPUT TYPE=\"text\"
    NAME=\"lastName\"
VALUE=\"" + form.lastName.value +"\" MAXLENGTH=20 SIZE=20>\n");
    capture.document.write("</TD></TR><TR><TD>");
228    capture.document.write("Email: <INPUT TYPE=text NAME=Email
VALUE=\"" + form.Email.value +"\" MAXLENGTH=20 SIZE=20>
(name@domain) <BR>\n");
```

FIG. 7B

```
230    capture.document.write("Home Phone #: <INPUT TYPE=text
       NAME=homePhone
VALUE=\"" + form.homePhone.value + "\" MAXLENGTH=10 SIZE=10>\n");
232    capture.document.write("Work Phone #: <INPUT TYPE=text
       NAME=workPhone
VALUE=\"" + form.workPhone.value + "\" MAXLENGTH=10 SIZE=10>\n");
234    capture.document.write("Fax Phone #: <INPUT TYPE=text NAME=
       homeFax
VALUE=\"" + form.homeFax.value + "\" MAXLENGTH=10 size=10>\N"
       capture.document.write("</TR</TD>\n");
       capture.document.write("</TABLE>\n");
       capture.document.write("<INPUT TYPE=submit NAME=Submit
VALUE=\"Submit Form\">\n");
       capture.document.write("</FORM >\n");
       capture.document.write("</CENTER></BODY></HTML>\n");
218    capture.document.close():
       }
       }
212    //Standard Routine to check for a blank field
          function isFieldBlank(theField) {
              if(theField.value = "")
                      return true;
              else
                      return false.
          }
216    //Standard Routine to check phone numbers for correct number of
       digits function is ValidPhoneNumbers(the Field) {
          inStr = theField.value;
          inLen = inStr.length;
          if(inLen==10){
              for(var i=0; i<inLen;i++) {
                  var ch = inStr.substring(i,i+1)
```

FIG. 7C

```
                              if (ch< "0" | | "9" < ch)
                                  return false;
                          }
                          return true;
                      }
                      return false;
                  }
202  </SCRIPT>
     </HEAD>
     <BODY>
     <TABLE BORDER = 0>
     <TR><TD>
     </TD>
     <TD><H2><I>Mortgage Application Form.</I></H2>
     </TD></TR>
     </TABLE>
152  <FORM ACTION=\"http://www.ibm.com/cgi-bin/mortgage.p1\
     NAME="verifyInputDemo"
     METHOD="post">
     <TABLE BORDER = 0>
     <TR><TD BGCOLOR=#FFFF00><B><I> Applicant
     Background</I></B></TD></TR>
     <TR><TD>
154  <INPUT TYPE="radio" NAME="titleCheck" VALUE="Mr"
     onClick="input0_choice = 'Mr'">Mr
156  <INPUT TYPE="radio" NAME="titleCheck" onClick = "input0_choice = 'Ms'">Ms
158  <INPUT TYPE="radio" NAME="titleCheck" onClick = "input0_choice = 'Mrs'">Mrs
160  <INPUT TYPE="radio" NAME="titleCheck" onClick = "input0_choice =
     'Miss'">Miss
```

| | |
|---|---|
| 162 | `<INPUT TYPE="radio" NAME="titleCheck" onClick = "input0_choice = 'Dr'">Dr </TD></TR><TR><TD>` |
| 164 | First Name: `<INPUT TYPE="text" NAME="firstName" VALUE="" MAXLENGTH=20 SIZE=20>` |
| 166 | Middle Initial: `<INPUT TYPE="text" NAME="middleInitial" MAXLENGTH=1 SIZE=1>` |
| 168 | Last Name:`< INPUT TYPE="text" NAME="lastName" MAXLENGTH=20 SIZE=20> </TD></TR><TR><TD>` |
| 170 | Email:`< INPUT TYPE="text" NAME="Email" MAXLENGTH=20 SIZE=20>`(name@domain) `</TD></TR><TR><TD>` |
| 172 | Home Phone #: `<INPUT TYPE="text" NAME="homePhone" MAXLENGTH=10 SIZE=10>` |
| 174 | Work Phone #: `<INPUT TYPE="text" NAME="workPhone" MAXLENGTH=10 SIZE=10>` |
| 176 | Home Fax #: `<INPUT TYPE="text" NAME="homeFax" MAXLENGTH=10 SIZE=10> </TD></TR> </TABLE>` <br><br> `<CENTER>` |
| 178 | `<INPUT TYPE="button" NAME="Save" VALUE="Capture Data" onClick="Download(this form)"> </CENTER>` |
| 180 | `</FORM> </BODY> </HTML>` |

FIG. 7E

| | |
|---|---|
| 308 | `</td></tr><tr><td>`Email: `<input TYPE=text Name=Email VALUE="smitty@ibm.net" MAXLENGTH=20 SIZE=20>` (name@domain) `<br>` |
| 310 | Home Phone #: `<input TYPE=text NAME=homePhone VALUE="1111111111" MAXLENGTH=10 SIZE=10>` |
| 312 | Work Phone #: `<input TYPE=text NAME=workPhone VALUE="2222222222" MAXLENGTH=10 SIZE=10>` |
| 314 | Fax Phone #: `<input TYPE=text NAME=homeFax VALUE="3333333333" MAXLENGTH=10 SIZE=10>` `</TR></TD>` `</table>` |
| 316 | `<input TYPE=submit NAME=Submit VALUE="Submit Form">` |
| 318 | `</form>` `</center></body></html>` |

FIG. 8B

Form Verification Demo - Microsoft Internet Explorer

File  Edit  View  Go  Favorites  Help

Address  file: A:\SMITTY.HTM

Save this form with a unique filename.
Mortagage Application Form.

Applicant Background

Mr. ▷ ← 442      First Name: Derek ← 444    Middle Initial: K ← 446    Last Name: Smith ← 448

Email: smitty@ibm.net ← 450  (name@domain)

Home Phone #: 1111111111 ← 552    Work Phone #: 2222222222 ← 454    Home Fax #: 3333333333 ← 456

Submit Form ← 440

INTERNET BROWSER BASED DATA ENTRY ARCHITECTURE

FIELD OF THE INVENTION

This invention relates to the technical field of Internet based data entry systems. More specifically, the invention is directed to a method and apparatus for entering data through a WEB browser in a disconnect mode providing local storage on a client computer for later transmission through the Internet in a connect mode to a WEB server computer.

BACKGROUND OF THE INVENTION

The Internet brings a world wide network of computers together by connecting WEB server computers with client computers. The connection is provided through a communications protocol known as the Transmission Control Protocol/Internet Protocol (TCP/IP). TCP/IP is essentially a suite of protocols that provide an infrastructure for the Internet.

A WEB server computer is a computer with associated programs that sends data over the Internet to a matching client computer having a browser capable of interpreting the data. The data is referred to as a WEB page and generally contains a Hypertext Markup Language (HTML) document. HTML is a tag based language used to define the format and content of a WEB page. A WEB page may also contain an Internet Programming Language, for example, JAVA (™) Scripts. JAVA Scripts extend the functionality of the WEB page beyond the limits of HTML tags. It is preferable that a browser running in a client computer be capable of interpreting both HTML tags and JAVA Scripts. Both Netscape (™) and Microsoft Internet Explorer (™) are examples of browsers capable of interpreting both HTML tags and JAVA Scripts.

A client computer may send data over the Internet to a matching WEB server through a Common Gateway Interface (CGI) running a Common Gateway Script (CGI Script) capable of receiving and interpreting the data. CGI is a protocol that provides a way in which the scripts are run. A CGI Script is an application program located on a WEB server that executes a non-HTML task.

For example, with a browser running in a client computer having an active WEB page, a set of HTML FORM tags can be used to create fields in a WEB page which accept input from the user for transmission to the WEB server. The ACTION attribute of a FORM tag defines the Universal Resource Locator (URL) that will accept the transmitted data. The URL contains a standard IP address. Associated with the set of FORM tags are two method attributes. These attributes define how data is sent back to the WEB server identified by the ACTION attribute. A POST method sends the data back to the WEB server separately from the URL and a GET method appends the data to the end of the URL. Also associated with the set of FORM tags is a SUBMIT element which displays a push button in the browser for sending the data to the WEB server for processing. The processing of the data occurs at the WEB server typically through a CGI Script.

The phenomenal growth rate of the Internet coupled with the significant advantages of a thin client model, hardware/software independence, and convergence of mobile computing with the Internet, provide a number of significant business opportunities in the area of data entry and central server processing. An example from the financial industry will illustrate such an opportunity.

A mortgage salesperson makes visits to customers at the customers' premises for the purpose of completing mortgage applications. During each customer visit for a mortgage application, the salesperson enters customer data into an electronic form located in a Browser on a mobile client computer. Customer data is transmitted to a WEB server for immediate validation prior to transmitting the customer information to a central business repository completing the mortgage application process. The opportunity is very attractive to business because it provides world wide access and hardware/software independence brought about by the combination of Internet and browser technologies.

While building such a business system on the Internet is attractive, there are a number of problems associated with building a mobile Internet based data entry system. Typically, a mobile salesperson does not have access to a local area network (LAN) connection or a telephony device which necessitates the requirement for a disconnect mode.

Browser technology does not presently support a disconnect mode. In a disconnect mode, local data file storage from the browser is blocked due to security issues. The file save option from a file pull down located within the Browser merely saves the base HTML file and not any data entered into the active fields.

A protocol for transferring files on the Internet known as File Transfer Protocol (FTP) is not desired due to the need for interaction with a salesperson during data transfer.

Custom application programs for data entry are not desired due to the development cost, maintenance cost, and difficulties associated with distribution and installation of custom software.

SUMMARY OF THE INVENTION

A primary object of the present invention is to provide a method and apparatus for a disconnect/connect Internet Browser Based data entry system.

Another object of the present invention is to provide data capture through a Browser with storage to a local file on a client computer for later transmission to a WEB server through the Internet.

Another object of the present invention is to provide data capture through a Browser with storage to a local file for retaining a local personal record of a business transaction.

Another object of the present invention is to provide a consistent user interface in a Browser for data entry in both the connect mode and the disconnect mode enabling the user to enter data in the same fashion in either mode.

Another object of the present invention is to provide Browser, hardware, and operating system independence by using existing Internet technologies and the WEB page language of the Internet known as HTML and JAVA Script.

According to one aspect of the present invention there is provided a method of capturing and storing at a client computer, user generated data entered into a WEB page displayed in a WEB Browser. The method comprises the computer-implemented steps of receiving data into an input object of a WEB page primary document displayed in said WEB Browser, accessing said object for extracting said data from the primary document, generating a secondary document capturing said data, and storing said secondary document and said data in a local store in said client computer.

According to another aspect of the present invention there is provided in a computer system for capturing and storing user generated data entered into a WEB page displayed in a WEB Browser. The computer system includes means for receiving the user generated data into an input object of a primary document displayed in the WEB Browser, means for accessing the object for extracting the data, means for generating a secondary document in the WEB Browser and capturing the data, and means for storing the secondary document and the data from the WEB Browser at a local store in the computer system.

According to a further aspect of the present invention there is provided a secondary document created from a WEB page displayed by a WEB browser that contains a hypertext markup language WEB page having at least one computer-generated hypertext markup language input tag including an initial value, the initial value having been extracted and captured from user generated data entered into a previously displayed hypertext markup language primary document in a WEB Browser.

BRIEF DESCRIPTION OF THE DRAWINGS

The foregoing and other objects, aspects and advantages of the invention will be better understood from the following detailed description of the preferred embodiment of the invention with reference to the accompanying drawings in which:

FIG. 6 illustrates the source contents of an initial application form menu WEB page of the present invention containing both HTML tags, JAVA Script, and textual information;

FIGS. 7A, 7B, 7C, 7D, 7E illustrate the source contents of a primary document of the present invention containing both HTML tags, JAVA script and textual information;

FIGS. 8A, 8B illustrate the source contents of a secondary document as generated by the present invention containing HTML tags, textual information, and captured data;

FIG. 12 illustrates another operational view of a secondary document with captured data as initial conditions in a browser;

DETAILED DESCRIPTION OF THE PREFERRED EMBODIMENT

The description of the preferred embodiment of the present invention is initially provided with reference to FIGS. 1 through 8 inclusive of the drawings.

Figure 1:
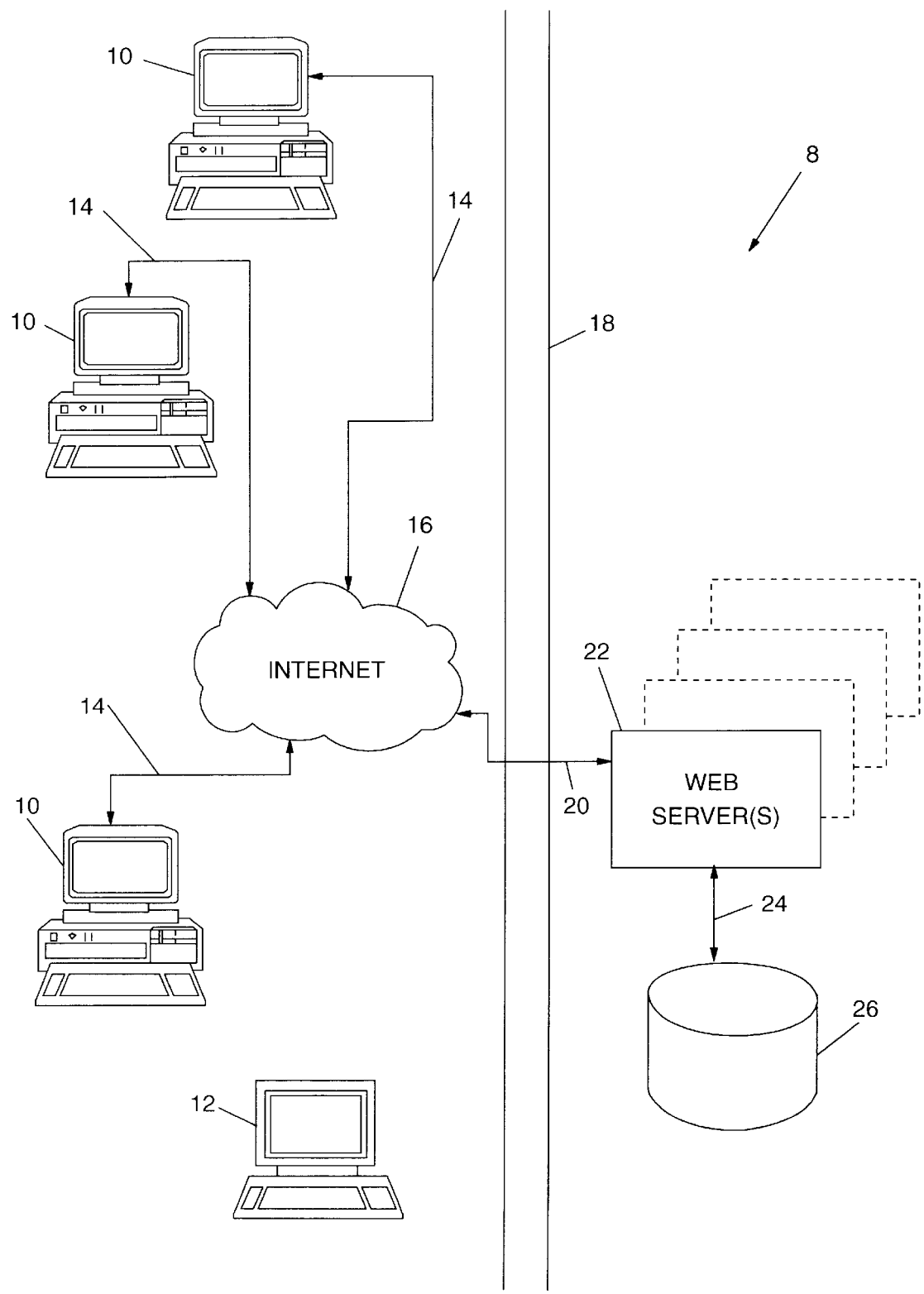
FIG. 1 is a diagrammatic representation of the Internet.

Referring now to FIG. 1, a diagrammatic representation of the Internet is generally shown at 8. A plurality of client computers 10 are shown connected by symbolic arrows 14 to the Internet 16. These connections 14 are typically achieved through a local area network (LAN) or telephony device well known in the art. A mobile client computer 12 is shown disconnected from the Internet 16. The functionality of the connected client computers 10 and the disconnected mobile client computer 12 is generally the same. The mobile client computer, for example may be an IBM THINKPAD™ 760ED, running Windows95™ as an operating system, a number of business application programs, an Internet Browser such as the Microsoft™ Internet Explorer, and Internet connection software such as the IBM Global Network Dialer. In this preferred embodiment the Browser is capable of interpreting a WEB page having HTML tags including the <FORM> tag, and also Java Scripts. The disconnected mobile client computer 12 has the capability to connect to the Internet 16 either through a LAN or telephony device when desired by a user.

The Internet is connected at 20 to at least one WEB server 22. The WEB server 22 is connected at 24 to at least one hard disk 26. The hard disk 26 contains an operating system, configuration files, log files, WEB application programs, WEB pages, and CGI Scripts. The WEB pages for the present embodiment contain HTML tags including the <FORM> tag, and an Internet Programming Language such as Java Scripts. The CGI Scripts of the WEB Server employ data processing techniques well known in the art.

The connection 20 is provided through a fire wall 18. The fire wall 18 provides a level or security between users on the Internet 16 and data and application programs on the WEB server 22. The fire wall 18 typically provides conditional access to outside users while blocking out unwanted intruders from the Internet 16.

Figure 2:
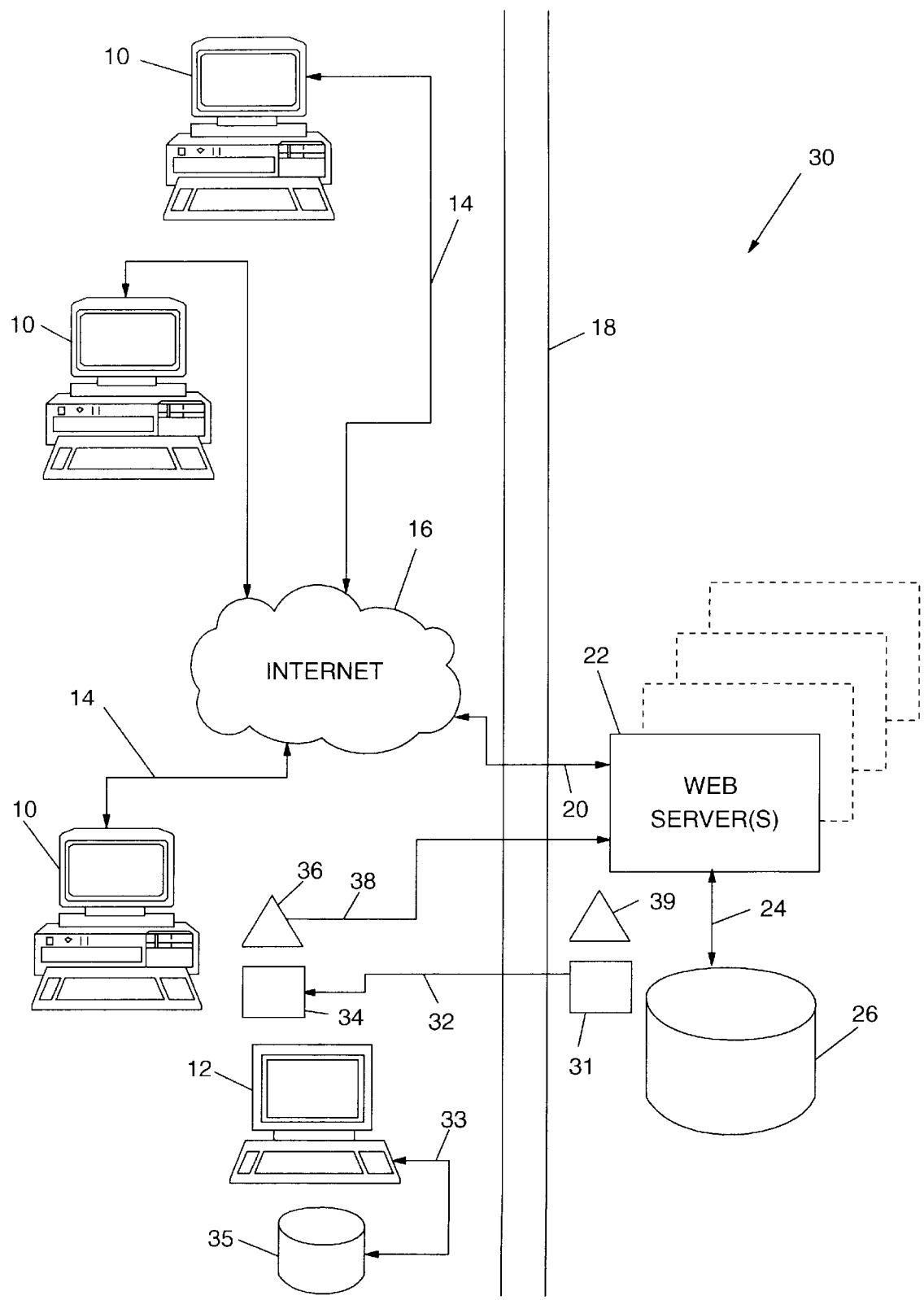
FIG. 2 is a diagrammatic representation of data flow through the Internet between a client computer and a WEB server.

Referring now to FIG. 2, a diagrammatic representation is provided of data flow between a client computer 10 and a WEB server 22 through the Internet 16. A user operating the client computer 10 makes a connection 14 to the Internet 16, for example from a telephony device. Once in the connect mode, the user enters the URL for the WEB server 22 which is passed through the Internet 16 through connection 20 to the specific WEB server 22. The WEB server 22 obtains a WEB page 31 from the hard disk 26 and provides the file 34 to the Browser of the client computer via the Internet through a series of connections indicated as 32. The WEB page 31 contains HTML tags and specifically, <FORM> tags, associated <INPUT> tags, and a <SUBMIT> tag. The user interacts with the WEB page, filling in the required input fields and with a point and click of a mouse pointer on a submit button, the data entered, shown as 36, is passed back via the Internet through a series of connections indicated as 38 to the WEB server 22 for processing. The WEB server 22 invokes a CGI Script located on the hard disk 26 to process the received data 39.

For the case of the disconnect mode, a user operating the client computer 12 may save data on a local hard disk 35 through an internal connection shown as 33. It is not possible in the disconnect mode to communicate with the WEB server 22 or any associated CGI Scripts located on the hard disk 26 as connected at 24 to the WEB server 22. Therefore, the user is responsible in the disconnect mode for local file management of the saved data files. Alternatively, a JAVA Applet may be deployed on the client computer to perform the function of local file management.

Figure 3:
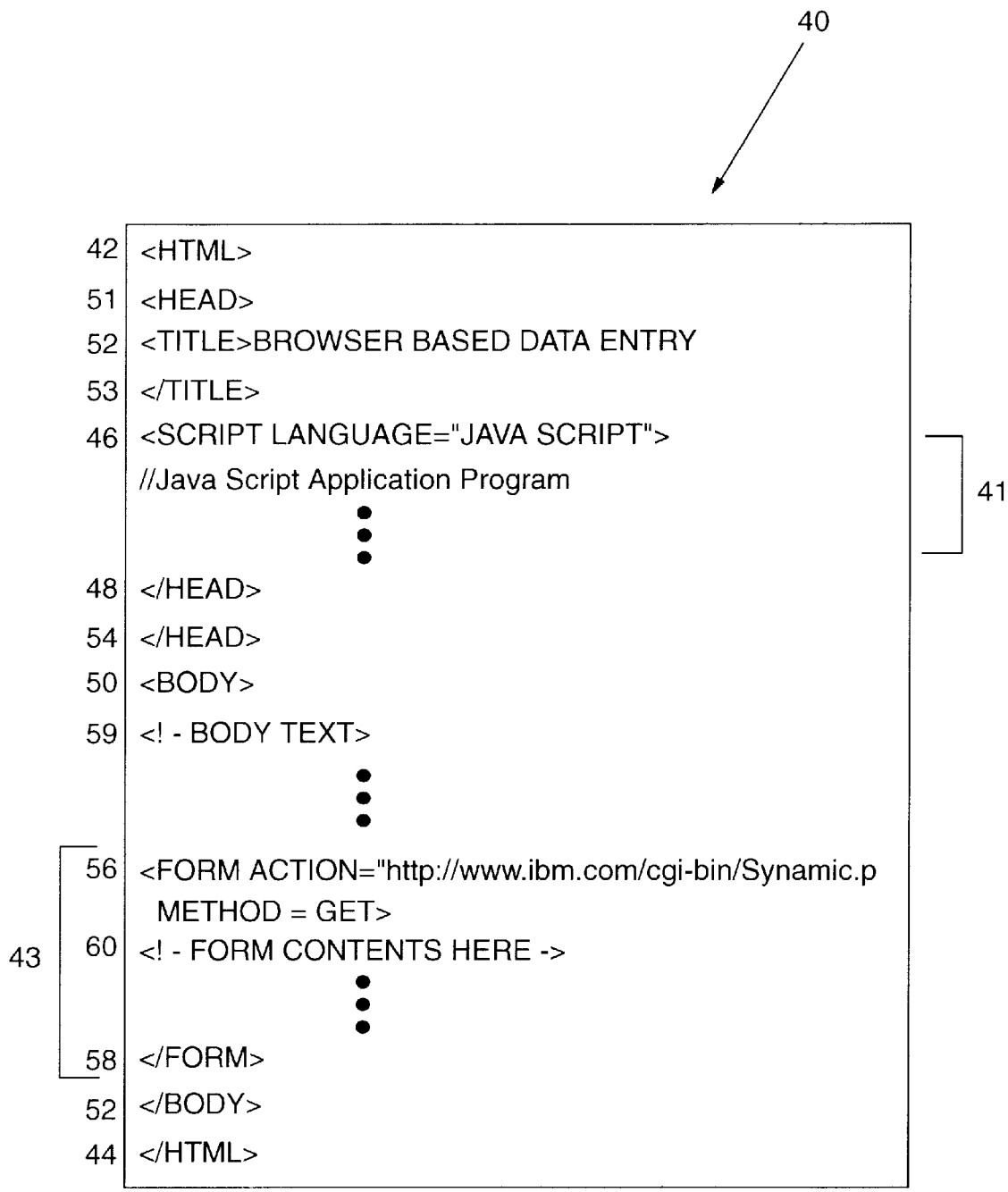
FIG. 3 is an example structure of a WEB document for transmission on the Internet and use in a Browser.

Referring now to FIG. 3, a generic document structure of a WEB page is shown. The WEB page provides the actual data flow from the WEB server to the client computer. The document structure of a WEB page is generally indicated as 40.

The document structure 40 contains a first logic area generally indicated as 41 and a second logic area generally indicated as 43. Within the document structure 40, the <TML> tag 42 and </HTML> tag 44 inform the Browser that it is reading an HTML document. The head section of the document structure 40 is defined between the <HEAD> tag 51 and the </HEAD> tag 54. Generally, the head section contains various tags that describe the document and provide meta-information about the file.

For example, the <TITLE> tag 52, "Browser Based Data Entry", and </TITLE> tag 53 describe the title of this WEB page.

The body of the document structure 40 is contained between the <BODY> tag 50 and the </BODY> tag 52. As indicated by the comment at 59, this section contains the body of the document with a combination of text characters and HTML tags.

The first logic area 41 is defined between the <SCRIPT LANGUAGE="Java Script"> tag 46 and the </SCRIPT> tag 48. Java Script is a computer language used to enhance the functionality of the document from within a Browser.

The second logic area 43 is defined between the <FORM ACTION="http://www.ibm.com/cgi-bin/dynamic.pl" METHOD=GET> tag 56 and the </FORM> tag 58. As indicated by the comment 60, this section contains the form data input component of the document using standard HTML tags.

Figure 4:
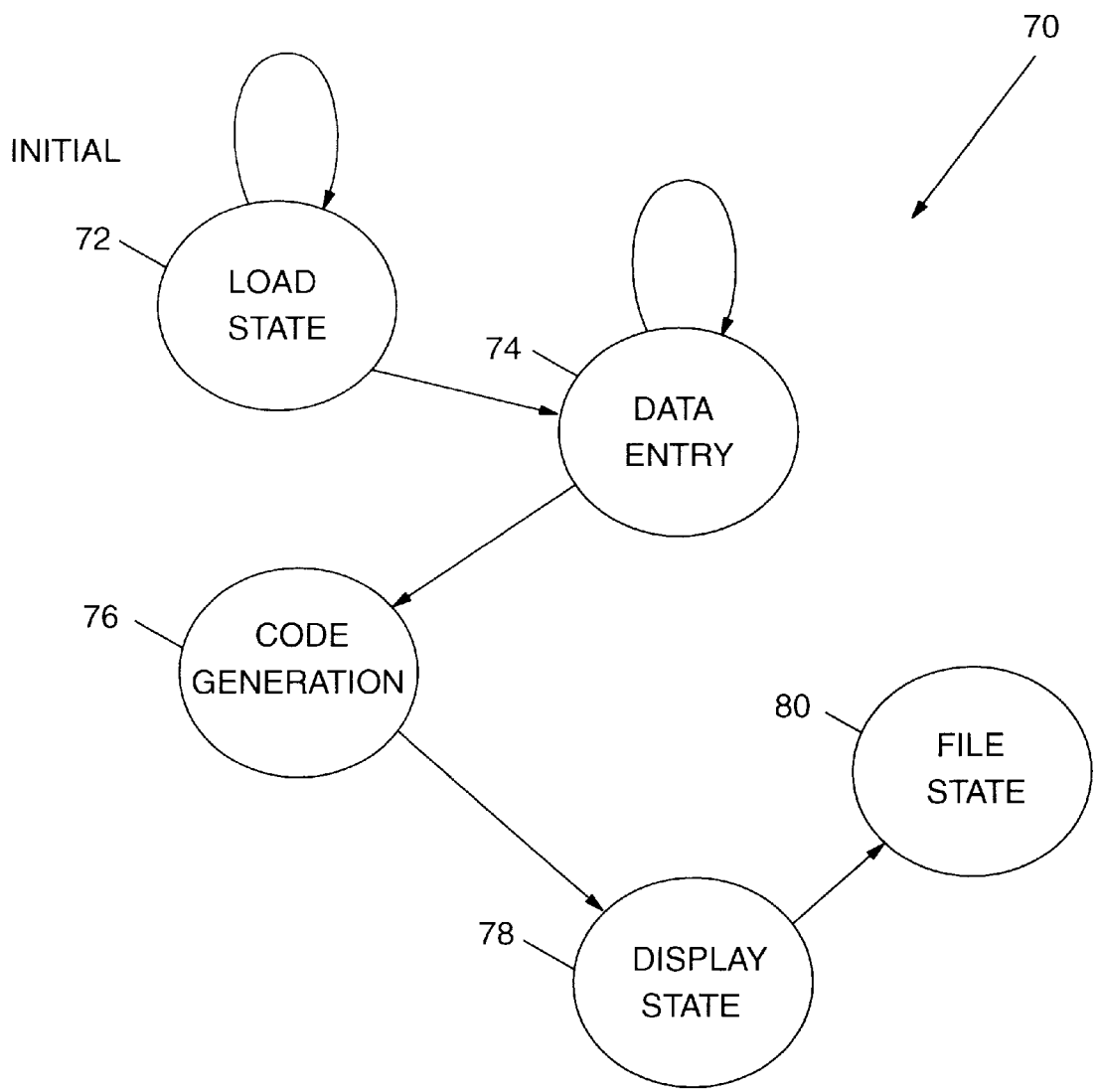
FIG. 4 is a finite state machine representation of the present invention.

Referring now to FIG. 4, a finite state machine representation of the present invention is generally shown at 70. The initial state is the load state 72 which loads an initial form menu WEB page of the present invention into a Browser on a client computer. The load state 72 is a function of the Browser. The initial form menu WEB page may be loaded into the Browser through the Internet in a connect mode, or from a local hard disk in a client computer in a disconnect mode. For the disconnect mode, the WEB page would be previously obtained through access to the Internet and saved locally on a hard disk in the client computer. The complete contents of the WEB page, source HTML files, graphical images, or other components must be received from the Internet before attempting to operate the present invention.

After the WEB page is loaded and the Browser has presented the desired menu information, an interaction by the user, causes the load state 72 to open another Browser window without the menubar or toolbar and loads the application form WEB page. A primary document is presented within the new Browser window and then the load state 72 passes control to the data entry state 74.

The data entry state 74 does not have access to the Browser menubar or toolbar in order to lock out any possible local store of a form without the capture of entered data. The data entry state 74 is a function of the WEB page and provides three functions. Firstly, data may be entered into the various fields, check boxes, or radio buttons. Secondly, data may be analyzed and validated for conformance to business rules. Thirdly, the user has control over the start of the code generation state. Once all of the data has been entered, checked by the business validation rules, and the user has activated the code generation state, the data entry state 74 passes control over to the code generation state 76.

The code generation state 76 is a function of the WEB page and is implemented in Java Script and located within the first logic area 41 of FIG. 3. During this state, a secondary document is opened. Document specific HTML tags and associated text are generated in the secondary document. An overall set of FORM tags are generated and entered into the secondary document. Included within the set of FORM tags are INPUT tags for text fields, radio buttons, and check boxes. Data entered into the primary document is extracted. The extracted data is entered into the secondary document as initial values for the INPUT tags.

The code generation state 76 passes control to the display state 78 which presents the generated secondary document as a new WEB page in another window of a Browser having the menubar and toolbar before passing control back to the file state 80 for review.

Once the user is satisfied with the data entry, the user activates the file state 80 through the file pull down menubar option of the Browser. The file state 80 completes the process by saving the generated secondary document with the captured data as entered by the user in a file on a local hard disk of the client computer. The process may be repeated to create and save a series of forms with captured data on a local hard disk for later transmission to a WEB server. This series of forms may also be used as personal records of business transactions.

Figure 5A:
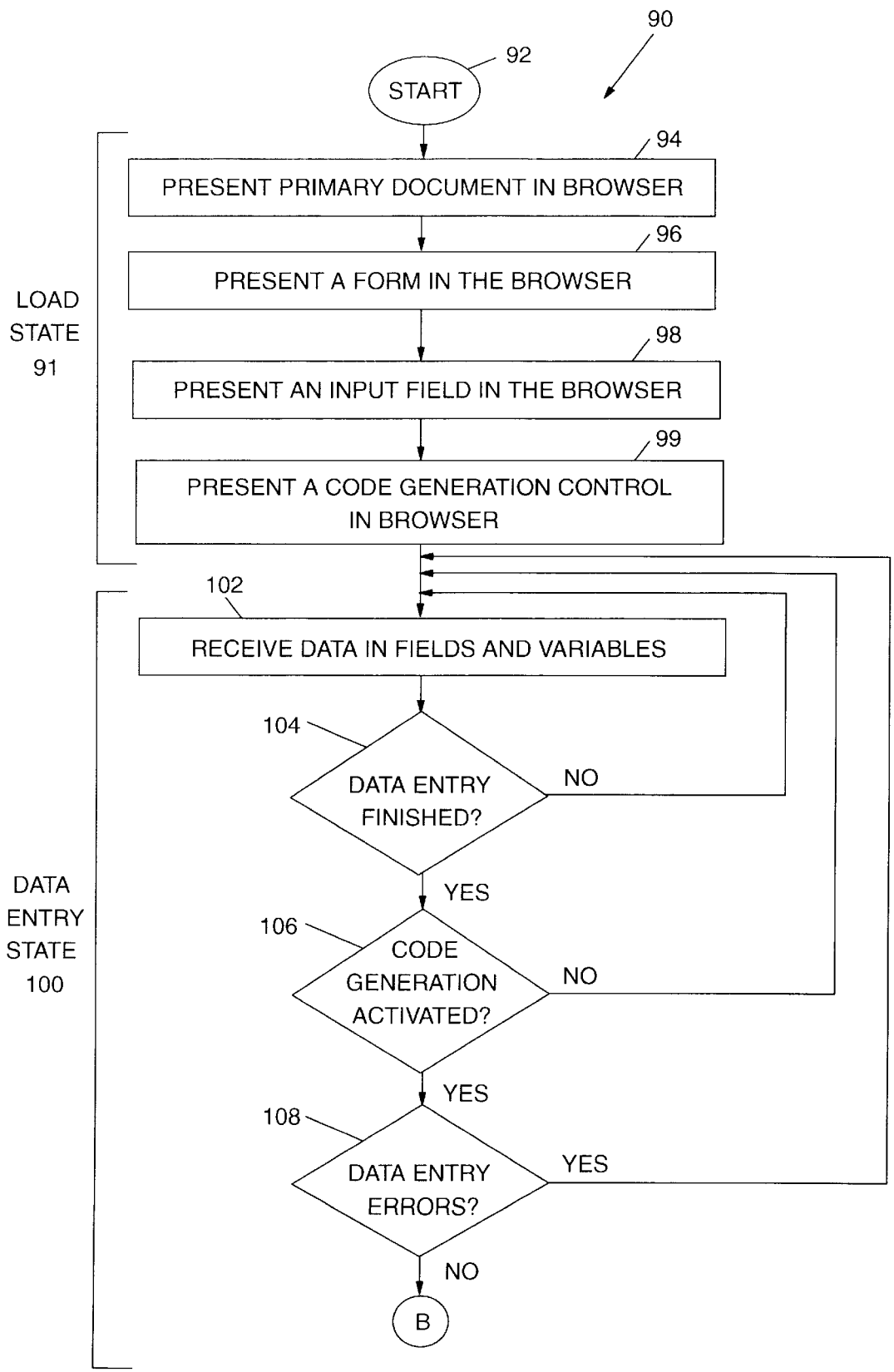
FIGS. 5A, 5B are flow chart representation of the present invention.
Figure 5B:
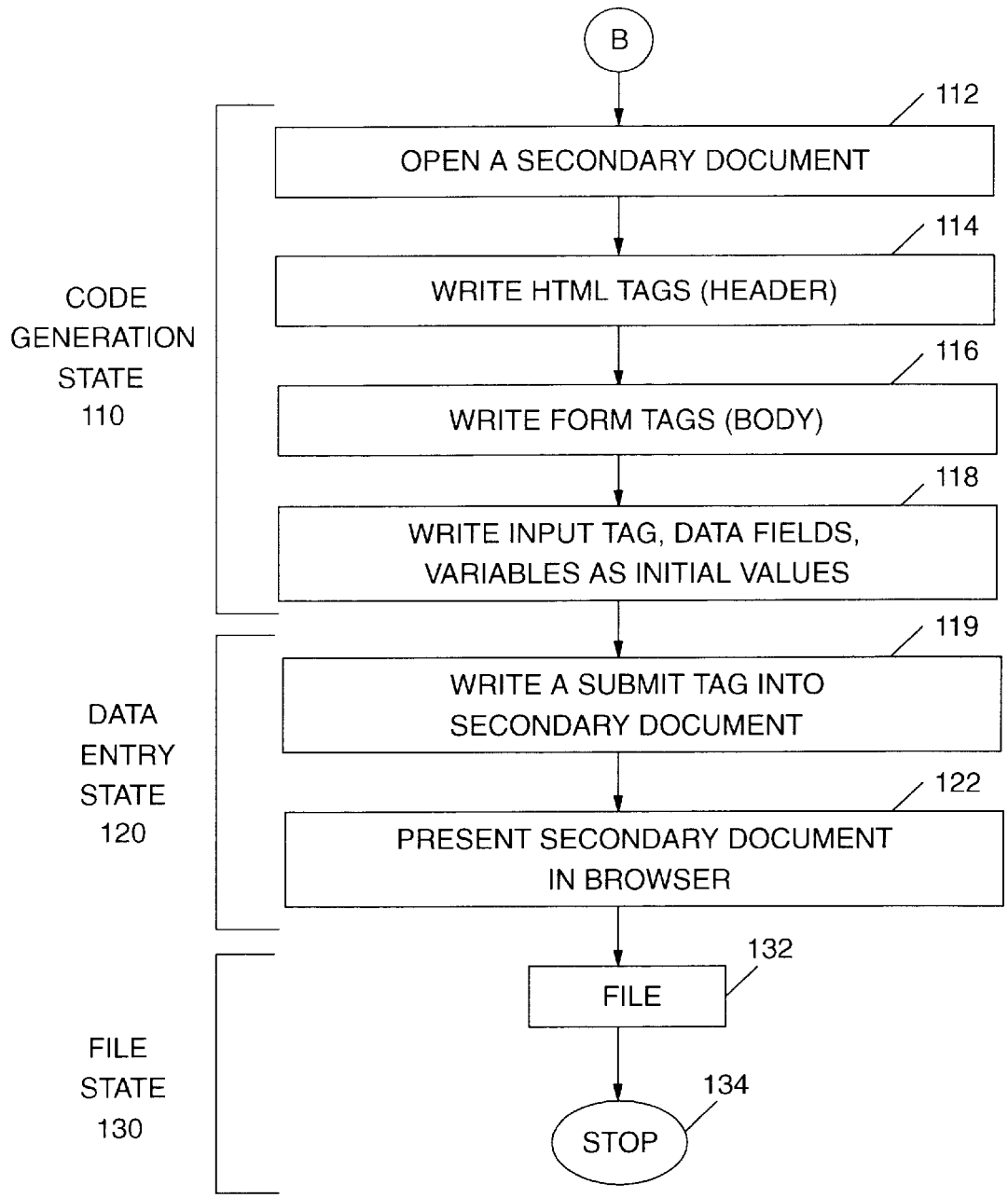

Referring now to FIG. 5, a flow chart of the present invention is generally shown at 90. The load state 91 of the flow chart is described first. The method starts at 92 and presents a primary document in a browser 94. The primary document contains HTML tags, text, JAVA Script, and FORM tags as previously described. A form is presented in the Browser 96 for the user to enter data. The form must contain at least one input field or object which is presented in the Browser 98 and does not contain an input tag of type SUBMIT. Next, a code generation control is presented in the Browser 99 typically in the form of a graphical button which may be interacted with by a user with a mouse point and click action.

The data entry state 100 follows the load state 91. The user interacts with the data input objects and enters data into fields 102. The data entered into fields is stored within a set of local Browser objects.

A check is made to determine if data entry is finished 104. If data entry is incomplete, the method loops and continues to receive data in the fields 102. Another check is made to determine if code generation activated 106. If code generation has not been activated, the method loops and continues to receive data in the fields 102. A final check is made to determine if there are any data entry errors 108. If there are data entry errors indicated by business validation rules for example, the method loops and continues to receive data in the fields 102. If code generation has been activated and there are no data entry errors, the method continues with the code generation state 110.

The code generation state 110 begins by opening a secondary document 112 within the Browser. The header HTML tags are written to the secondary document 114. A set of body HTML form tags are written to the secondary document 116. The data entered into the primary document is extracted and written as initial values for the INPUT tags 118. An INPUT tag of type SUBMIT 119 is written to the secondary document. Once the secondary document has been generated, the method continues with the display state 120.

The display state portion 120 presents the secondary document 122 in the Browser for review by the user. If the secondary document is complete and correct, the method continues with the file state 130.

The file state 130 allows the secondary document including the captured data to be filed 132 locally on a hard disk in the client computer for later transmission to a WEB server through a connect mode with the Internet.

For FIG. 6 through FIG. 14, an example mortgage application illustrates the preferred embodiment of the present invention. The mortgage application includes eight input fields to include: a Title of type RADIO field, a First Name of type TEXT field, a Middle Initial of type of TEXT field, a Last Name of type field, an E-mail type of TEXT field, a Home Phone of type TEXT field, a Work Phone of type TEXT field, and a Home Fax of type TEXT field. Those skilled in the art will appreciate the number and type of input fields may vary without departing from the scope and spirit of the present invention.

Referring now to FIG. 6, the source contents of an initial form menu WEB page is shown generally at 150. The INPUT tag at 154 provides a user operated button to select and request a load of a mortgage application form. The button, upon a mouse point and click event, executes the Create The Form function. The Create The Form function opens a new Browser window with the SCRIPT tag at 152. The new Browser window does not have a menubar or toolbar resulting in preventing a possible save of a form without captured data.

Referring now to FIG. 7, the complete source contents of a primary document 201 containing both HTML tags, a set of FORM tags, JAVA Scripts and textual information are described with respect to the first logic area 41 and the second logic area 43 as referred to in the previous description of FIG. 3.

The first logic area 41 begins with the SCRIPT tag at 200 and ends with the SCRIPT tag at 202. A function is defined at 204 as "Download(form)" and performs three subfunctions. The first subfunction is data error checking and business rule validation. The second subfunction is creating a secondary document. The third subfunction is extracting the entered data from the second logic area 43, capturing the entered data and generating initial values for the secondary document.

The first subfunction, data error checking, begins with the comment "//Example First Check For Blank Fields" at 206 and continues till the comment "//Example Check For Valid Field" at 208. The logic checks a data entry field for blank entries which are considered mandatory for data input. If an error is found, a message describing the error is presented to the user and processing in the first logic area 41 halts. A empty field checking function begins with the comment "//Standard Routine to check for a blank field" at 212 and continues till the comment "//Standard Routine to check phone numbers for correct number of digits" at 216. The blank field checking function is used throughout the data error checking process.

Persons skilled in the art will appreciate that the data error checking subfunction is optional and may be removed or modified without departing the scope and spirit of the present invention.

The first subfunction, business rule validation, begins with the comment "//Example Check for Valid Field" at 208 and continues till the SCRIPT tag at 210. This subfunction checks the syntax of a phone number to ensure an area code exists with the data entered. The subfunction begins with the comment "//Standard Routine to check phone number for correct number of digits" at 216 and continues till the SCRIPT tag at 202.

Persons skilled in the art will appreciate that the business rule validation subfunction is optional and may be removed or modified without departing the scope and spirit of the present invention.

The second subfunction, creating a secondary document in another Browser window, begins with the SCRIPT tag at 207 and continues until the SCRIPT tag at 218. The SCRIPT tag at 207 closes the Browser window without the menubar and toolbar. The SCRIPT tag at 209 opens a new Browser window with a menubar and toolbar. The addition of the menubar and toolbar provides access to the File Pull Down for saving the secondary document on a client computer. The creating process is achieved through a capture.document.open( ) statement at 210, followed by a series of capture.document.write(". . ."); statements ending with a capture.document.close( ) statement at 218.

The capture.document.open( ) statement opens a new document output stream. The capture.document.write(". . .") statements write information contained in the (". . .") area to the new document output stream, namely the secondary document. The capture.document.write(". . .") statements of the present invention define and create the content of the secondary document.

The capture.document.close( ) statement at 218 closes the document output stream causing the contents of the secondary document to be displayed in the Browser.

Persons skilled in the art will appreciate, while the second subfunction is not optional, the subfunction may be modified without departing the scope and spirit of the present invention.

The third subfunction of extracting and capturing entered data, and generating the initial values within the secondary document is described later within this description.

The second logic area 43 begins with the FORM tag at 152 and ends with the FORM tag at 180. The defined form provides a template for an initial data entry by the user interacting with the WEB page in a Browser on a client computer.

The first FORM tag at 152 contains the encoded URL for the specific WEB server and the associated CGI Script required to process the form in a connect mode on the Internet. The contents of the URL are very important as it defines a specific WEB server connected to the Internet and a specific CGI Script required to process the input data. The contents of the URL are provided to the secondary document.

A series of INPUT tags at 154, 156, 158, 160, and 162 provide input fields of type RADIO. These input fields receive a selection from the user for the Title of a person, for example, "Mr." and are selected by a mouse point and click operation. The INPUT tag at 164 provides a TEXT field to receive a First Name data entry. The data is stored in the firstName object. The INPUT tag at 166 provides a TEXT field to receive a Middle Initial data entry. The data is stored in the middleInitial object. The INPUT tag at 168 provides a TEXT field to receive a Last Name data entry. The data is stored in the lastName object. The INPUT tag at 170 provides a TEXT field to receive an Email data entry. The data is stored in the Email object. The INPUT tag at 172 provides a TEXT field to receive a Home Phone Number data entry. The data is stored in the homePhone object. The INPUT tag at 174 provides a TEXT field to receive a Work Phone Number data entry. The data is stored in the workPhone object. The INPUT tag at 176 provides a TEXT field to receive a Home Fax Number data entry. The data is stored in the homeFax data entry.

The INPUT tag at 178 defines a button which activates through a mouse point and click action to execute the JAVA Script "Download(this.form)" contained in the first logic area 41 as previously described within this description.

Figure 8A:
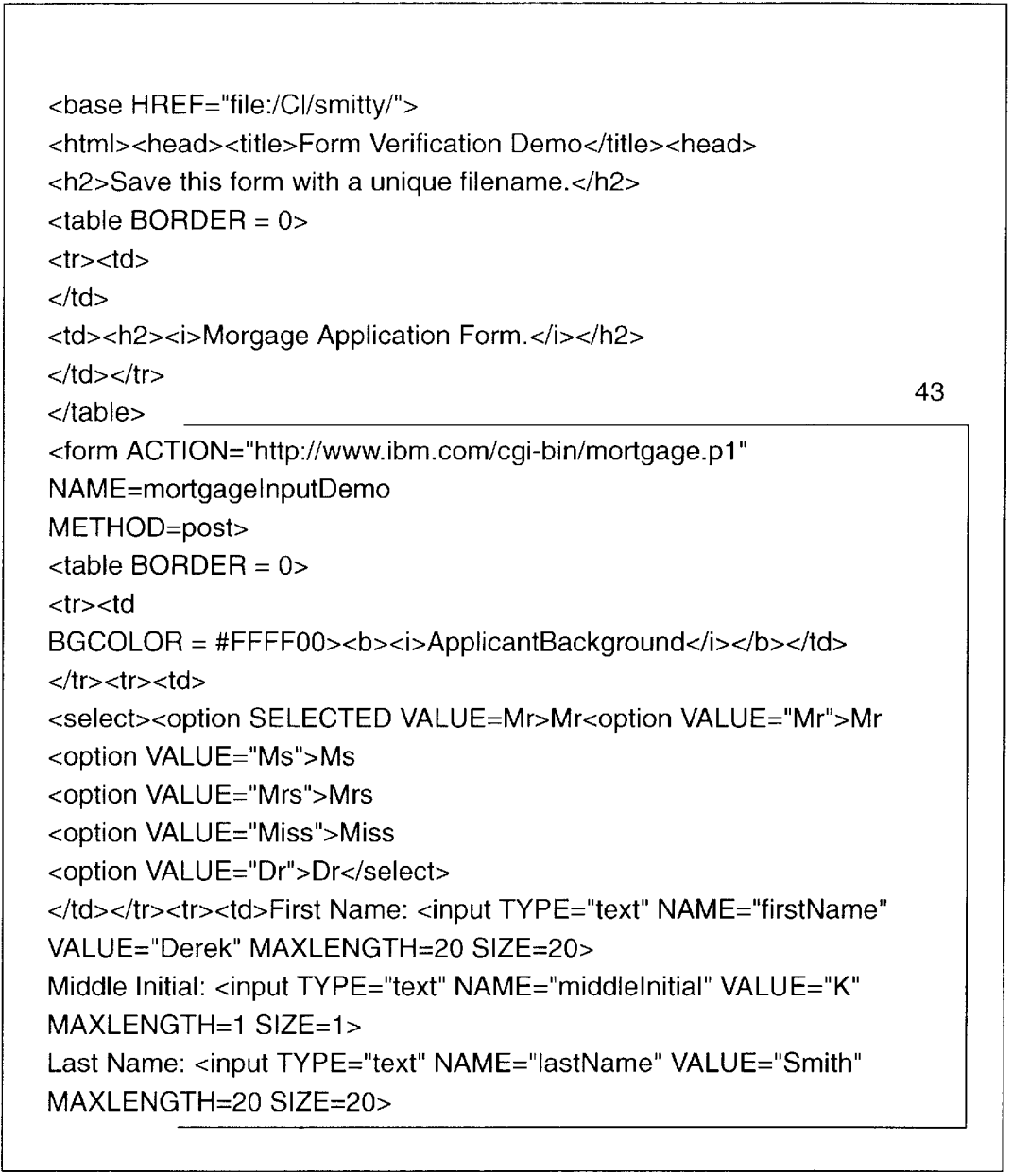

Referring now to FIG. 8, the complete source content of a secondary document 300 as generated by the present invention is shown containing HTML tags, textual information, and captured data. Specifically, the newly generated second logic area 43 is described.

The first FORM tag at 301 contains the encoded URL for the specific WEB server and the associated CGI script required to process the form in a connect mode on the Internet. The OPTION tag at 303 provides a list box with a default based on a previous data entry of "Mr.". The INPUT tag at 302 provides for an input type of TEXT with a default based on a previous data entry of "Derek". The INPUT tag at 304 provides for an input type of TEXT with a default based on a previous data entry of "K". The INPUT tag at 306 provides for an input type of TEXT with a default based on a previous data entry of "Smith". The INPUT tag at 308 provides for an input type of TEXT with a default based on a previous data entry of "smitty@ibm.net". The INPUT tag at 310 provides for an input type of TEXT with a default based on a previous data entry of "1111111111". The INPUT tag at 312 provides for an input type of TEXT with a default based on a previous data entry of "2222222222". The INPUT tag at 314 provides for an input type of TEXT with a default based on data entry of "3333333333". The INPUT tag at 316 provides a SUBMIT button which when selected by a mouse point and click action in a connect mode will post the data to the WEB server identified in the FORM tag at 301. The FORM tag at 318 completes the form definition.

The first logic area of the primary document is not generated within the secondary document. The first logic area is removed as it has served its generation function and would waste available hard disk space in the client computer as well as degrade the rate of transmission in a connect mode on the Internet. Optionally, the first logic area may be generated and retained in the secondary document providing an edit capability before saving the secondary document to a hard file located in the client computer.

Referring now to FIG. 7 and FIG. 8, the third subfunction of extracting and capturing entered data from the primary document, and generating the initial values within the secondary document previously introduced within this description is now described in detail.

Two possible methods of transformation exist. A first type of transformation from a series of INPUT tags of type RADIO to a single OPTION tag for a list box relates to the example Title selection. A second type of transformation is possible from an INPUT tag of type TEXT to an INPUT tag of type TEXT with initial conditions relates to the other data entry examples.

The Title selection is described with reference to the INPUT tags 154, 156, 158, 160, 162 from the second logic area 43 of FIG. 7, the capture.document.write(". . .") statement at 220 from the first logic area 41 of FIG. 7, and the INPUT tag 303 from the second logic area 43 of FIG. 8. a Title is selected by a mouse point and click action. The selection is stored in the "input0_choice" variable of the INPUT tag at either 154, 156, 158, 160, or 162 depending on the selection. The capture.document.write(". . .") statement at 220 performs the data extraction, capture, and initial value generation. This statement also provides a transformation from a series of INPUTs of type RADIO to a list box OPTION with a default value. This statement writes a line of text to the secondary document and creates an OPTION tag at 303. a Title selected by the user is stored in the "input0$_{13}$ choice" value. This selection is extracted by setting he SELECTED VALUE to "input". the process of writing this text line and the SELECTED VALUE to the secondary document performs the capture. The corresponding OPTION tag at 303 of the secondary document of FIG. 8 contains the initial value for the selected title.

The First Name field is described with reference to the INPUT tag at 302 of FIG. 8 from the second logic area 43, the INPUT tag at 164 of FIG. 7 from the second logic area 43, and the capture.document.write(". . .") statement at 222 of FIG. 7 from the first logic area 41.

Data entered by the user as the First Name is stored the "firstName" object of the INPUT tag at 222. The capture.document.write(". . .") statement at 164 performs the data extraction, capturing, and initial value generation. This statement writes a line of text to the secondary document and creates an INPUT tag at 302. Data entered by the user is stored in the "firstName" object. This data is extracted by setting the VALUE to "form.firstName.value" which defines the form, the object member within the form, and the value property. The process of writing this text line and VALUE to the secondary document performs the capture. The corresponding INPUT tag at 302 of the secondary document of FIG. 8 contains the initial value for the entered data.

Data entered by the user as the Middle Initial is stored in the "middleInitial" object of the INPUT tag at 224. The capture.document.write(". . .") statement at 166 performs the data extraction, capturing, and initial value generation. This statement writes a line of text to the secondary document and creates an INPUT tag at 304. Data entered by the user is stored in the "middleInitial" object. This data is extracted by setting the VALUE to "form.middleInitial.value" which defines the form, the object member within the form and the value property. The process of writing this text line and VALUE to the secondary document performs the capture. The corresponding INPUT tag at 304 of the secondary document of FIG. 8 contains the initial value for the entered data.

Data entered by the user as the Last Name is stored in the "lastName" object of the INPUT tag at 226. The capture.document.write(". . .") statement at 168 performs the data extraction, capturing, and initial value generation. This statement writes a line of text to the secondary document and creates an INPUT tag at 306. Data entered by the user is stored in the "lastName" object. This data is extracted by setting VALUE to "form.LastName.value" which defines the form, the object member within the form and the value property. The process of writing this text line and VALUE to the secondary document performs the capture. The corresponding INPUT tag at 306 of the secondary document of FIG. 8 contains the initial value for the entered data.

Data entered by the user as Email is stored in the "Email" object of the INPUT tag at 228. The capture.document.write (". . .") statement at 170 performs the data extraction, capturing, and initial value generation. This statement writes a line of text to the secondary document and creates an INPUT tag at 308. Data entered by the user is stored in the "Email" object. This data is extracted by setting VALUE to "form.Email.value" which defines the form, the object member within the form and the value property. The process of writing this text line and VALUE to the secondary document performs the capture. The corresponding INPUT tag at 308 of the secondary document of FIG. 8 contains the initial value for the entered data.

Data entered by the user as Home Phone Number is stored in the "homePhone" object of the INPUT tag at 230. The capture.document.write(". . .") statement at 172 performs the data extraction, capturing, and initial value generation. This statement writes a line of text to the secondary document and creates an INPUT tag at 310. Data entered by the user is stored in the "homePhone" object. This data is extracted by setting VALUE to "form.homePhone.value" which defines the form, the object member within the form and the value property. The process of writing this text line and VALUE to the secondary document performs the capture. The corresponding INPUT tag at 310 of the secondary document of FIG. 8 contains the initial value for the entered data.

Data entered by the user as Work Phone Number is stored in the "workPhone" object of the INPUT tag at 232. The capture.document.write(". . .") statement at 174 performs the data extraction, capturing, and initial value generation. This statement writes a line of text to the secondary document and creates an INPUT tag at 312. Data entered by the user is stored in the "workPhone" object. This data is extracted by setting VALUE to "form.workPhone.value" which defines the form, the object member within the form and the value property. The process of writing this text line and VALUE to the secondary document performs the capture. The corresponding INPUT tag at 312 of the secondary document of FIG. 8 contains the initial value for the entered data.

Data entered by the user as Home Fax Number is stored in the "homeFax" object of the INPUT tag at 234. The capture.document.write(". . .") statement at 176 performs the data extraction, capturing, and initial value generation. This statement writes a line of text to the secondary document and creates an INPUT tag at 314. Data entered by the user is stored in the "homeFax" object. This data is extracted by setting VALUE to "form.homeFax.value" which defines the form, the object member within the form and the value property. The process of writing this text line and VALUE to the secondary document performs the capture. The corresponding INPUT tag at 314 of the secondary document of FIG. 8 contains the initial value for the entered data.

Persons skilled in the art will appreciate, while the third subfunction is not optional, the subfunction may be modified without departing the scope and spirit of the present invention.

Operation and use of the preferred embodiment of the present invention is described with reference to FIGS. 9 through 14 inclusive.

Figure 9:
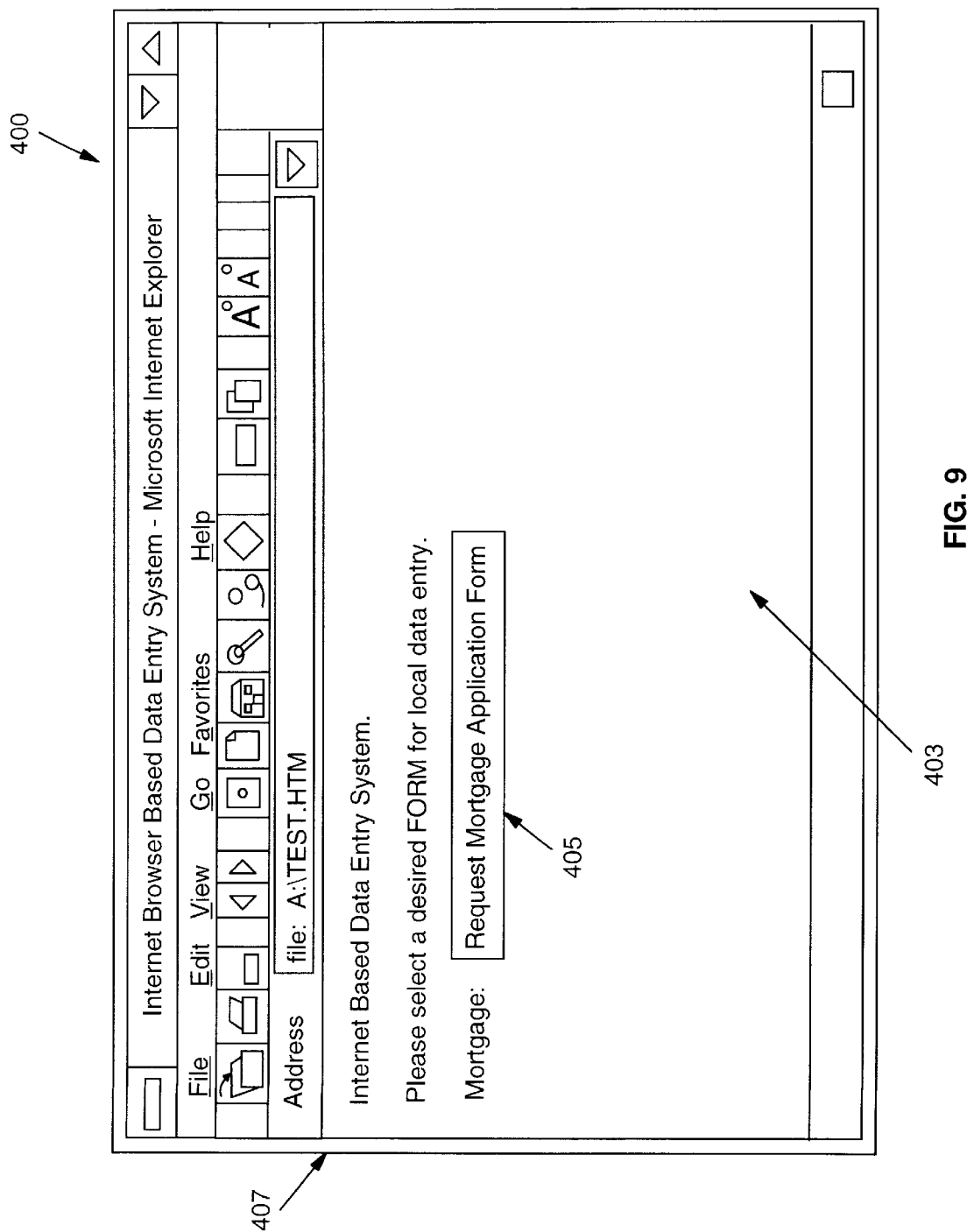
FIG. 9 illustrates an operational view of the initial application form menu WEB page of the present invention.

Referring now to FIG. 9, an operational view of an initial form menu WEB page is shown generally at 403 within a Browser 400. The menubar and toolbar at 407 are available to the Browser. The Request Mortgage Application Form button 405, upon a mouse point and click event, opens a new Browser window without a menubar or toolbar and loads the primary document.

Figure 10:
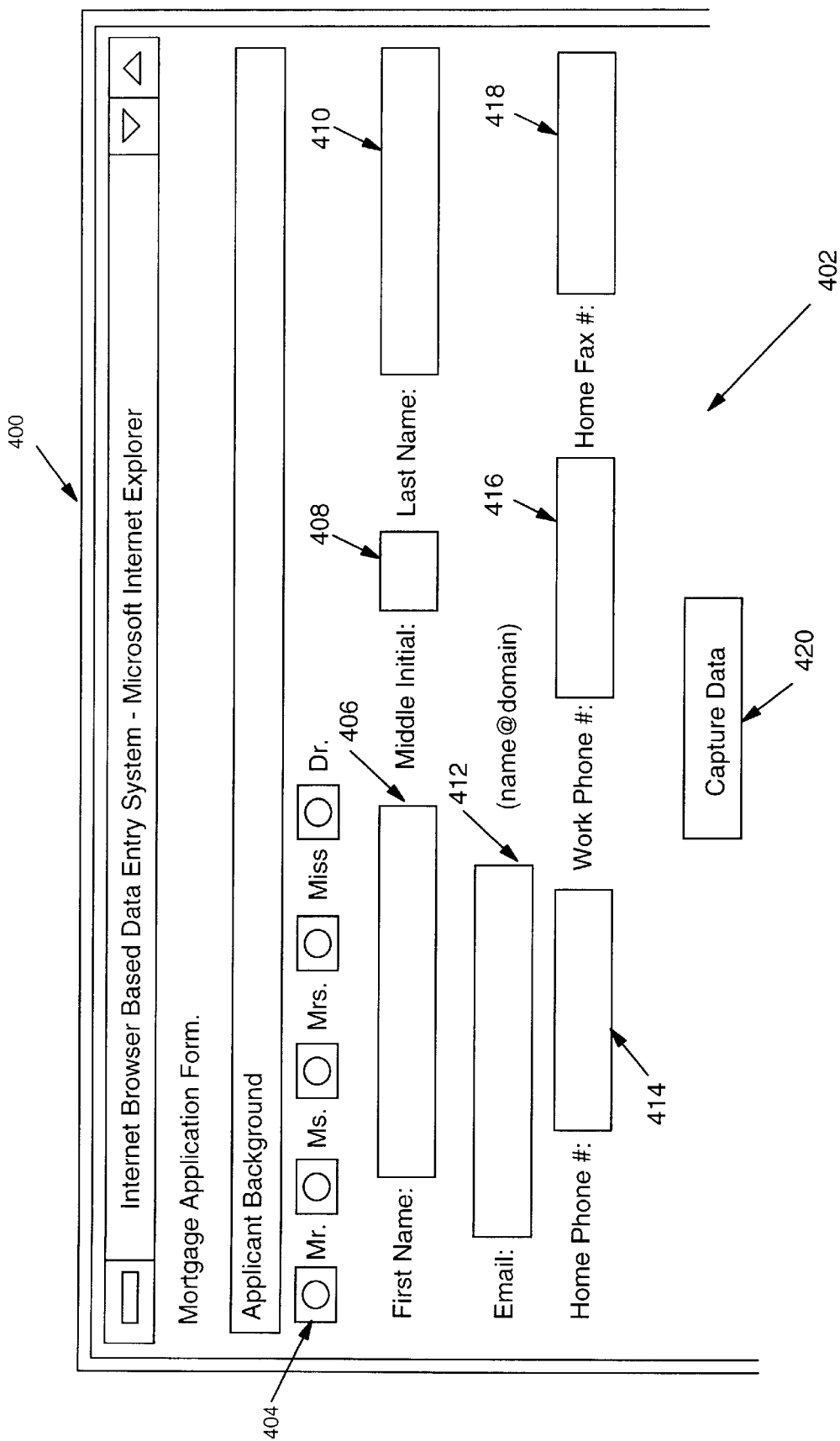
FIG. 10 illustrates an operational view of a primary document of the present invention before data entry in a browser.

Referring now to FIG. 10, an operational view of a primary document 402 of the present invention is illustrated in a Browser 400 before data entry. Note, the menubar and tool bar are removed. The source contents of the primary document are shown in FIG. 7 and were previously described within this description.

The Microsoft Internet Explorer Browser 400 is shown containing the primary document 402. The primary document 402 is loaded by entering the local URL in the address area of the Browser or from the file pull down menu with the open file option.

The primary document 402 contains a list of RADIO type INPUT fields generally indicated at 404. a mouse point and click action by the user selects a particular RADIO field. An INPUT field 406 provides for data entry of your First Name. An INPUT field 408 provides for data entry of your Middle Initial. An INPUT field 410 provides for data entry of your Last Name. An input field 412 provides for data entry of your Email address. An INPUT field 414 provides for data entry of your Home Phone Number. An INPUT field 416 provides for data entry of your Work Phone Number. An INPUT field 418 provides for data entry of your Home Fax Number. Finally, a button 420 "Capture Data" provides activation of the code generation state which captures the entered data and creates the secondary document.

Figure 11:
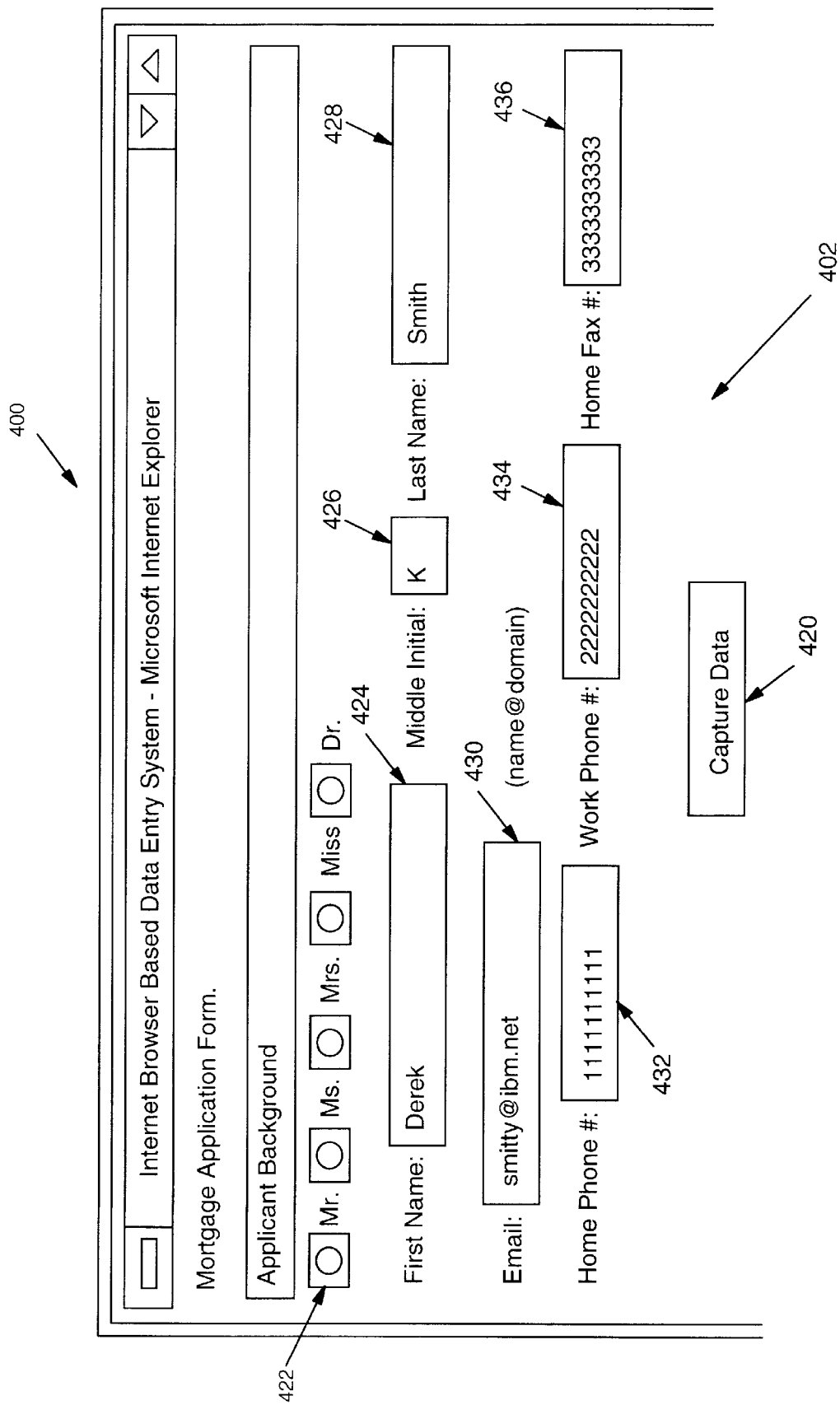
FIG. 11 illustrates another operational view of a primary document of the present invention after data entry in a browser.

Referring now to FIG. 11, another operational view of a primary document 402 of the present invention is illustrated in a Browser 400 after data entry. Still no menubar or tool bar in the Browser. The source contents of the primary document are shown in FIG. 7 and previously described within this description.

The user has interacted with the RADIO input fields generally indicated as 422 with a mouse point and click action to select "Mr." as data input. "Derek" 424 has been entered from the keyboard into the First Name field. "K" 426 has been entered from the keyboard into the Middle Initial field. "Smith" 428 has been entered from the keyboard into the Last Name field. "smitty@ibm.net" 430 has been entered from the keyboard into the E-mail field. "1111111111" 432 has been entered from the keyboard into the Home Phone Number field. "2222222222" 434 has been entered from the keyboard into the Work Phone Number field. Lastly, "3333333333" 436 has been entered from the keyboard into the Home Fax Number field.

At this point, the data entry is local only to the Browser 400. The user must select the button 420 "Capture Data" to enter into the code generation state which captures the entered data and creates the secondary document. The button 420 is selected by a mouse point and click action.

Referring now to FIG. 12, an operational view of a secondary document 458 generated by the present invention is illustrated in a Browser 400 with captured data. Now the menubar and toolbar are available within the Browser. The source contents of the secondary document are shown in FIG. 8 and were previously described within this description.

The RADIO buttons are transformed into a list box having captured the data entry of "Mr." as an initial value 442. The First Name INPUT field contains the captured data entry of "Derek" as an initial value 444. The Middle Initial INPUT field contains the captured data entry of "K" as an initial value 446. The Last Name INPUT field contains the captured data entry of "Smith" as an initial value 448. The E-mail INPUT field contains the captured data entry of "smitty@ibm.net" as an initial value 450. The Home Phone Number INPUT field contains the captured data entry of "1111111111" as an initial value 452. The Work Phone Number INPUT field contains the captured data entry of "2222222222" as an initial value 454. The Home Fax Number INPUT field contains the captured data entry of "3333333333" as an initial value 456.

The secondary document at this point is ready to be saved by the user on a local hard disk in the client computer for later transmission to a WEB server. a button 440, "Submit Form" has been added to the secondary document 458 and provides, through a mouse point and click action by the user, a mechanism to transmit the captured data to a WEB server through the Internet in a connect mode.

Figure 13:
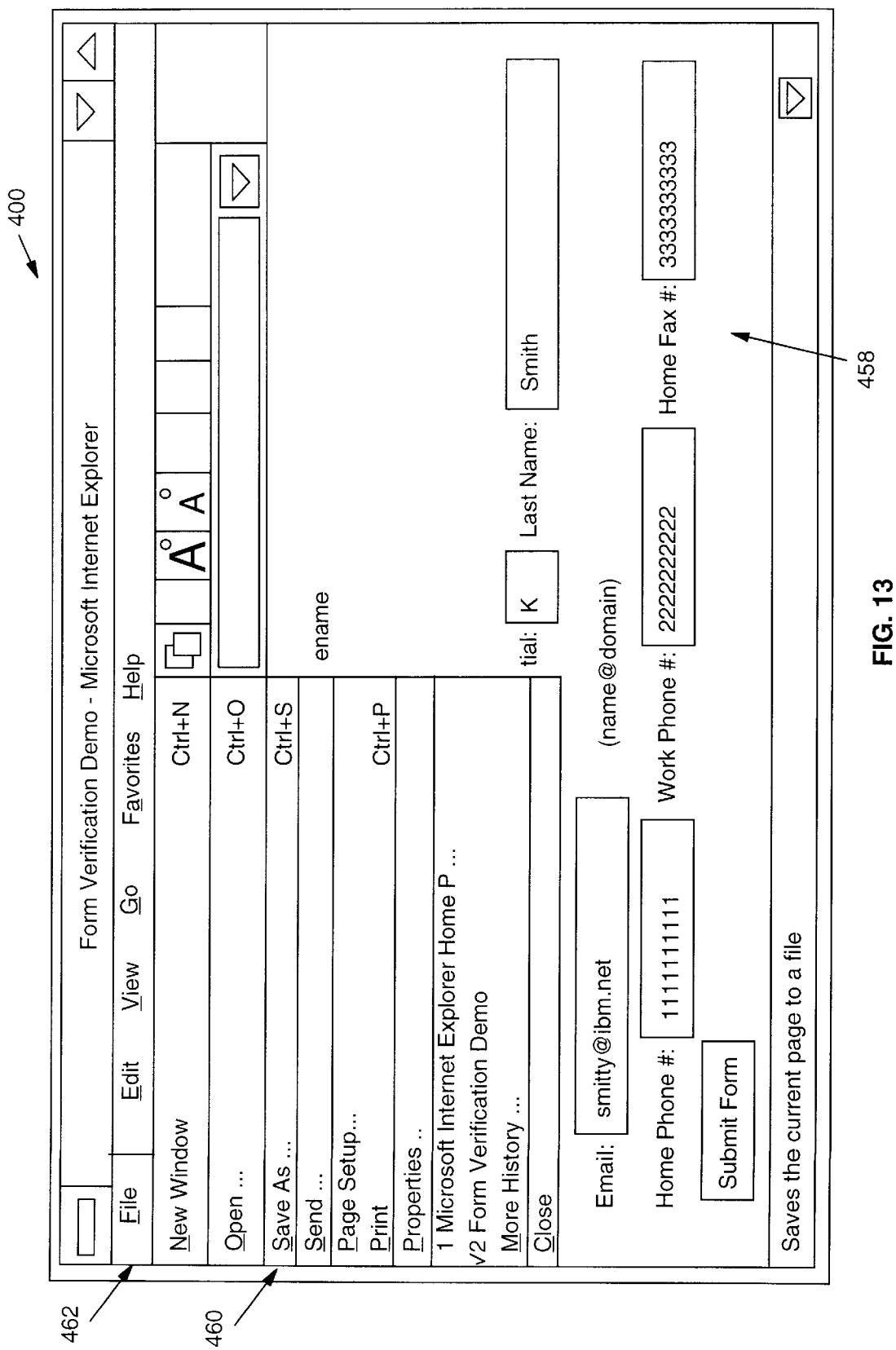
FIG. 13 illustrates a first step of storing the secondary document and captured data locally in a hard file of a client computer.

Referring now to FIG. 13, a first step of storing the secondary document 458 with captured data is illustrated.

The user first selects by a mouse point and click action the File Pull Down 462 from the Browser 400. Within the list, the user then selects the Save As 460 option.

Figure 14:
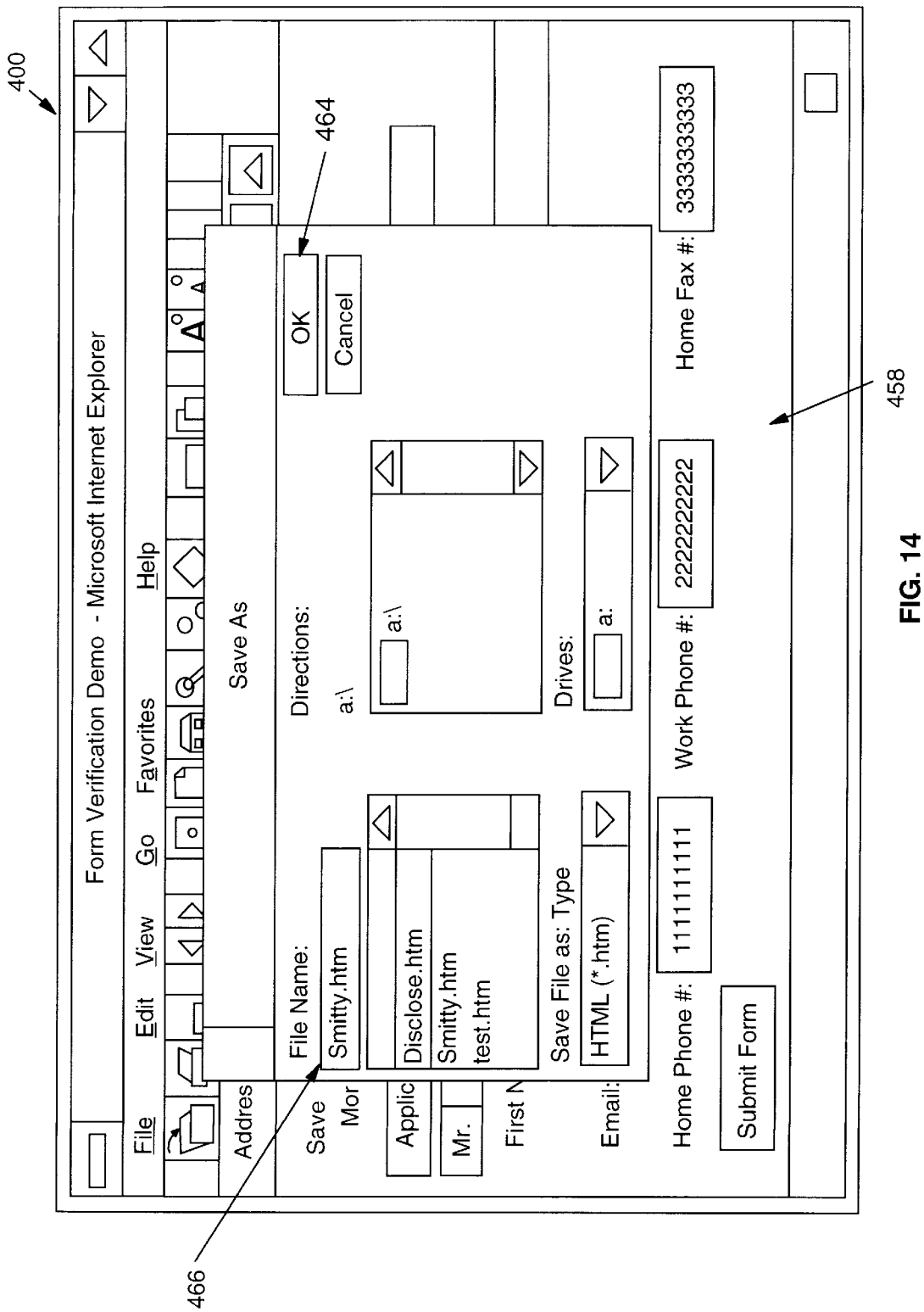
FIG. 14 illustrates a second step of storing the secondary document with captured data locally in a hard file of a client computer.

Referring now to FIG. 14, a second step of storing the secondary document 458 with captured data locally in a hard file of a client computer is illustrated. The user enters the name of the file in the File Name field 466 though the keyboard and through another mouse point and click action on the OK button 464 saves the secondary document and captured data locally on a hard disk in the client computer under the name of "customer.htm".

The secondary document and captured data may be sent through the Internet to a WEB server during a connect mode. The user connects the client computer to the Internet by either a LAN or telephony device and dials access to the Internet. Once connected, the URL for the specific WEB server is entered into the address line of the Browser to establish a connection. From either the address line or File Pull Down of the Browser, the saved file "customer.htm" is loaded back into the Browser. The user through a mouse point and click action selects the "Submit" button to transmit the captured data to the WEB server and activate the associated CGI Scripts to process the received data. The process may be repeated for each additional saved secondary document.

It should be readily understood that the foregoing description is only illustrative of the invention and in particular provides a preferred embodiment of the invention. Various alternatives and modifications can be devised by those skilled in the art without departing from the spirit of the invention. Accordingly, the present invention is intended to embrace all such alternatives, modifications and variations which fall within the scope of the appended claims.

The embodiments of the invention in which an exclusive property or privilege is claimed are defined as follows:

1. A method of capturing and storing at a client computer user generated data entered into a WEB page displayed in a WEB browser comprising the computer implemented steps of:
   receiving user generated data entered into an input object of a WEB page primary document displayed in said WEB browser at the client computer;
   accessing said object for extracting said data from the primary document;
   generating a secondary document capturing said data; and
   storing said secondary document and said data in a local store in said client computer.

2. A method according to claim 1 further comprising the step of presenting at least one data input object in said primary document for accepting user generated data.

3. A method according to claim 2 further comprising the step of providing activation control in said primary document for selectively activating said step of accessing said object after said data is entered into said input object.

4. A method according to claim 3 further comprising the step of generating a WEB Server address and a submit control in said secondary document for sending said data to a WEB Server for processing.

5. A method according to claim 4 further comprising the step of transforming said input object from said primary document to an input object in said secondary document having an initial setting.

6. A method according to claim 5 further comprising the step of checking said data received in said input object for error and providing a capability to correct said error.

7. A method according to claim 6 wherein said step of checking said input object for error includes identification of blank data.

8. A method according to claim 7 wherein said step of checking said input object for error includes validation of said data to a predefined business rule.

9. A method according to claim 8 further comprising the step of presenting said secondary document within said WEB Browser prior to storing said secondary document in said a local store.

10. In a computer system for capturing and storing user generated data entered into a WEB page displayed in a WEB browser comprising the:
    means for receiving, at a client computer, user generated data into an input object of a primary document displayed in said WEB browser at the client computer;
    means for accessing said object for extracting said data from the primary document;
    means for generating a secondary document in said WEB Browser and capturing said data; and
    means for storing said secondary document and said data from said WEB Browser at a local store in said client computer.

11. The computer system according to claim 10 further comprising:
    activation control means in said primary document for selectively activating said means for accessing said object and said means for generating a secondary document.

12. The computer system according to claim 11 further comprising:
    means for generating a WEB Server address and a submit control in said secondary document for sending said data to a WEB Server for processing.

13. The computer system according to claim 12 further comprising:
    means for checking said input object for data errors.

14. The computer system according to claim 13, wherein said means for checking said input object for data errors includes means to check for blank data and to provide error correction.

15. The computer system according to claim 14 wherein said means for checking said input object for data errors includes means to validate said data with predefined business rules and to provide error correction.

16. The computer system according to claim 13 wherein said primary document includes a first logic area containing document transformation and data processing controls and a second logic area containing document presentation and data input controls.

17. The computer system according to claim 16 wherein said secondary document includes a second logic area containing document presentation and data input controls.

18. The computer system according to claim 17 wherein said means for receiving said user generated data includes a hypertext markup language input tag in said primary document.

19. The computer system according to claim 18 further comprising means for transforming said input tag from said primary document to a corresponding hypertext markup language tag with an initial setting in said secondary document.

20. A secondary document created from a WEB page displayed by a WEB browser comprising:
    a hypertext markup language WEB page having at least one computer-generated hypertext markup language input tag including an initial value; and
    said initial value having been extracted and captured from user generated data entered into a previously displayed hypertext markup language primary document in a WEB Browser.

21. A secondary document according to claim 20, further comprising a control for sending said initial value to a WEB Server for processing of said data.

22. A secondary document created from a WEB page displayed on a WEB browser comprising:

a hypertext markup language WEB page having at least one computer-generated hypertext markup language option tag including an initial selection; and said initial selection extracted and captured from data entered into a previously displayed hypertext markup language primary document in a WEB Browser.

23. A secondary document according to claim 22, further comprising a control for sending said initial selection to a WEB Server for processing of said data.

24. A method according to claim 9 in which said WEB page contains hypertext markup language and Internet programming language functions.

* * * * *